UNITED STATES PATENT OFFICE.

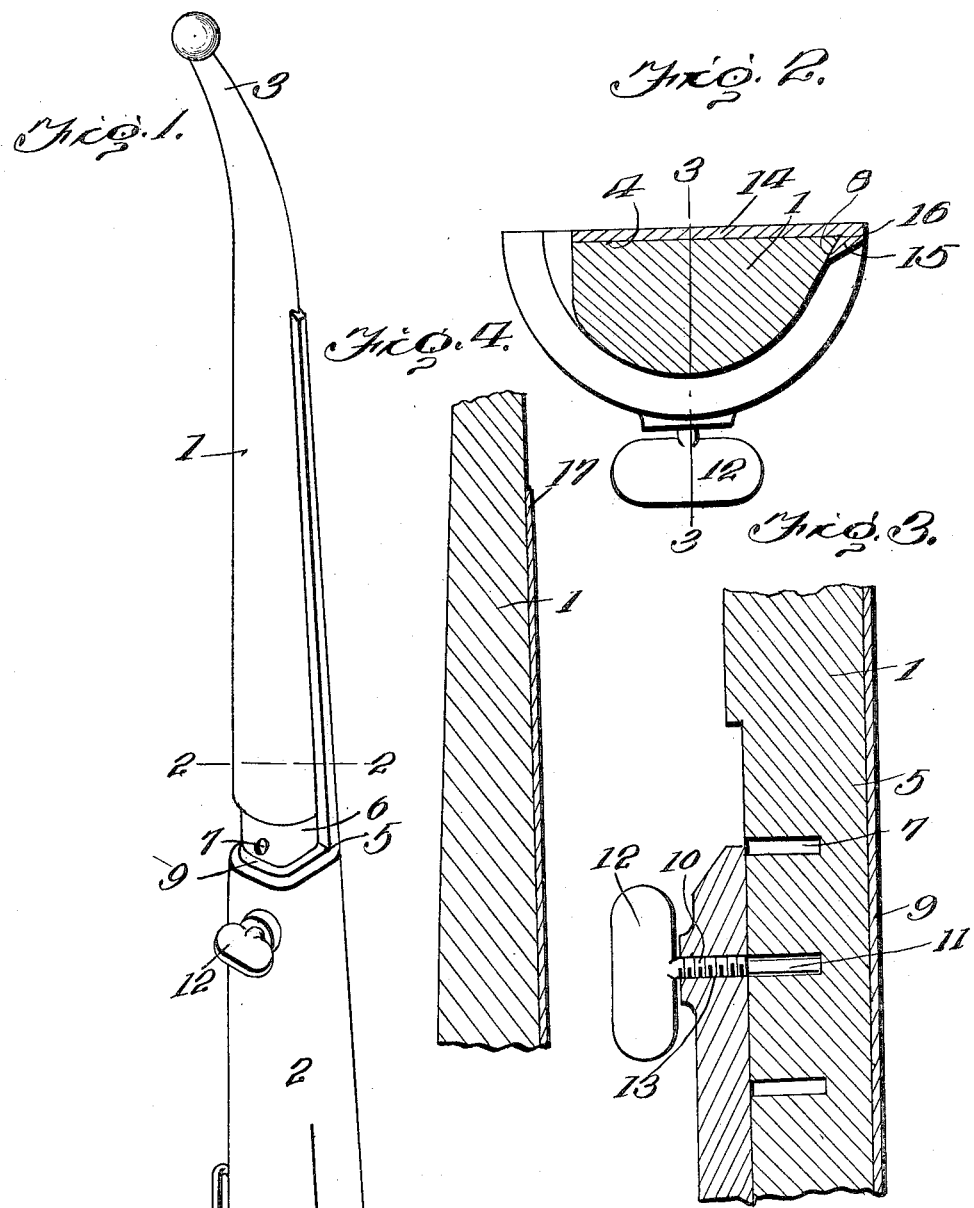

RALPH R. BURKHART, OF SPOKANE, WASHINGTON.

HAME.

1,104,623.    Specification of Letters Patent.    Patented July 21, 1914.

Application filed August 20, 1913. Serial No. 785,714.

*To all whom it may concern:*

Be it known that I, RALPH R. BURKHART, a citizen of the United States, residing at Spokane, in the county of Spokane and State of Washington, have invented certain new and useful Improvements in Hames, of which the following is a specification.

This invention relates to hames and has as its object to provide a hame which may be readily adjusted so as to be adapted to fit harness collars of various sizes.

It is one object of the invention to so construct the hame that the relatively adjustable sections thereof will not be liable to become displaced after having been properly adjusted and further, to so construct these sections that the hame will have practically the same exterior contour and present substantially the same appearance at all positions of adjustment of the sections.

The invention aims further to provide means for effectually preventing spreading of the hame sections and to reinforce the connection between the sections substantially throughout their entire length without, however, adding materially to the dimensions of the hame.

In the accompanying drawings: Figure 1 is a perspective view of a hame constructed in accordance with the present invention. Fig. 2 is a horizontal sectional view on approximately the line 2—2 of Fig. 1. Fig. 3 is a vertical sectional view on the line 3—3 of Fig. 2. Fig. 4 is a vertical sectional view taken above the plane of Fig. 3.

In the drawings the hame is illustrated as consisting of an upper section indicated in general by the numeral 1 and a lower section indicated in general by the numeral 2. The upper section 1 is provided with the usual outwardly curved upper end portion 3 and the rear face of this section is flat throughout its entire length as indicated at 4 in Fig. 2 of the drawings, the forward face being transversely curved also as shown in the said figure. The lower portion of the section 1 has the dimensions of this curved face reduced so as to form an approximately semi-cylindrical stock 5 which at one side is co-extensive with the corresponding side of the upper portion of the section but which at its other side is spaced slightly inwardly of the line of extent of the corresponding side of the upper portion of the section as indicated at 6 and clearly shown in Fig. 1 of the drawings.

For a purpose to be presently explained, the convex side of the lower portion 5 of the section 1 is formed with a vertically extending series of sockets 7 the walls of which are preferably plain and these sockets extend toward but terminate short of the flat side 4 of the section. Also for a purpose to be presently pointed out, that edge of the upper portion of the section 1 which is non-coextensive with the edge of the lower portion of the section, is beveled as shown at 8. The lower section 2 corresponds in general form to the lower portion of the ordinary one-piece hame and its upper end is formed with a substantially semi-cylindrical socket 9 opening at the upper end of the section. It will be observed by reference to Figs. 1 and 3 of the drawings, that the lower portion 5 of the upper section 1 is telescopically fitted in the socket 9 and that consequently the sections 1 and 2 may be relatively longitudinally adjusted so as to lengthen or shorten the hame as a whole.

In order to hold the sections of the hame at adjustment, a set screw is provided and the shank of this screw has a threaded portion 10 and an unthreaded portion 11, the shank being provided at its end opposite the unthreaded portion 11 with a head 12. The forward side of the socketed upper end of the section 2 is formed with an opening 13 the wall of which is threaded to receive the threaded portion 10 of the set screw and it will be observed that when the set screw is in place the unthreaded portion 11 thereof will project into one or another of the sockets 7 whereby to secure the desired result.

In order that the sections of the hame may be held against relative displacement after they have been properly adjusted and in order that the connection between the sections may be practically as substantial as if the hame were integral throughout, the section 2 thereof is formed at its upper end with an upwardly projecting flat-sided relatively thin extension 14, the rear face of which occupies the same plane as the rear flat side of the lower portion of the section and this extension 14 is provided at one edge with a longitudinally extending flange 15 having its inner side extending at an acute angle to the forward face of the extension whereby to form a guideway 16 to receive the beveled edge 8 of the section 1, it being observed that the flat rear face of said section 1 rests against the flat forward face of the extension 14. By the provision of the flange 15 the sections 1 and 2 are braced throughout the length of their contacting portions and said sections are held securely against relative displacement in a forward or rearward direction. By reference to Fig. 4 of the drawing it will be observed that the extension 14 is greatly decreased in thickness in the direction of its upper end so that at its upper extremity the rear face of the extension gradually merges into the plane of the rear face of the section 1 as indicated at 17.

From the foregoing description of the invention it will be understood that the sections of the hame may be readily and quickly adjusted so as to lengthen or shorten the hame as a whole and thereby adapt it for use in connection with collars of various sizes and that the sections of the hame are securely held against relative displacement after the desired adjustment has been secured.

Having described my invention, what I claim is:

1. In a hame, assembled sections, one of said sections having a socket and the other section having a stock slidably and adjustably fitted within the socket, the second-mentioned section having a flat side and the first-mentioned section having a flat-sided extension projecting beyond the receiving end of the socket, and contacting the said side of the second-mentioned section, and means for holding the sections at adjustment.

2. In a hame, assembled sections, one of said sections having a socket and the other section having a stock slidably and adjustably fitted within the socket, the second-mentioned section having a flat side and the first-mentioned section having a flat-sided extension projecting beyond the receiving end of the socket and contacting the said side of the second-mentioned section, and means for holding the sections at adjustment, the surface of the extension merging with the said side of the second-mentioned section.

3. In a hame, assembled sections, one of said sections having a socket and the other section having a stock slidably and adjustably fitted within the socket, the second-mentioned section having a flat side and the first-mentioned section having a flat-sided extension projecting beyond the receiving end of the socket and contacting the said side of the second-mentioned section, one side of the second-mentioned section being beveled and the said extension being provided along one edge with a flange fitting said beveled edge, and means for holding the sections at adjustment.

In testimony whereof I affix my signature in presence of two witnesses.

RALPH R. BURKHART. [L. S.]

Witnesses:
C. L. BOLTON,
J. W. BURKHART.

Copies of this patent may be obtained for five cents each, by addressing the "Commissioner of Patents, Washington, D. C."